United States Patent [19]

Meiller et al.

[11] Patent Number: 5,177,845
[45] Date of Patent: Jan. 12, 1993

[54] PROCESS FOR THE PRODUCTION OF A FOAM-BACKED CUSHION PORTION

[75] Inventors: Hermann Meiller; Helmut Storch, both of Amberg, Fed. Rep. of Germany

[73] Assignee: Grammer AG, Amberg, Fed. Rep. of Germany

[21] Appl. No.: 573,373

[22] Filed: Aug. 27, 1990

[30] Foreign Application Priority Data

Aug. 31, 1989 [DE] Fed. Rep. of Germany ....... 3928885

[51] Int. Cl.$^5$ .............................................. B29C 67/22
[52] U.S. Cl. ..................................... 29/91.1; 29/458; 264/46.4; 264/46.6; 264/46.7
[58] Field of Search .................... 264/46.4, 46.5, 46.6, 264/46.8, 46.7; 156/213, 220, 245; 29/458, 91.1

[56] References Cited

U.S. PATENT DOCUMENTS

| 4,323,406 | 4/1982 | Morello | 264/46.4 |
| 4,860,415 | 8/1989 | Witzke | 264/46.4 |
| 4,873,036 | 10/1989 | Urai | 264/46.4 |
| 4,925,513 | 5/1990 | Witzke et al. | 156/213 |
| 4,973,235 | 11/1990 | Shoji | 264/46.4 |

Primary Examiner—Allan R. Kuhns
Attorney, Agent, or Firm—Elliot M. Olstein; Raymond J. Lillie

[57] ABSTRACT

A process for the production of a foam-backed cushion portion with a cover covering same on all sides includes turning the cover inside out and applying the cover over a first mold portion of blade-like configuration with its outward surface over the first mold portion, arranged two second mold portions at respective sides of the first mold portion at a spacing therefrom, thereby forming at least one mold cavity between the first mold portion and the second mold portions. A reaction mixture is then introduced into the mold cavity to fill same with foam forming foam backing portions on the cover. The mold is then opened and the foam-backed cover is removed from the first mold portion and turned inside out to provide a foam-backed cushion portion, the cover which was disposed on the inward side of the foam material coming to lie on the outward side of the foam-backed cushion portion.

9 Claims, 3 Drawing Sheets

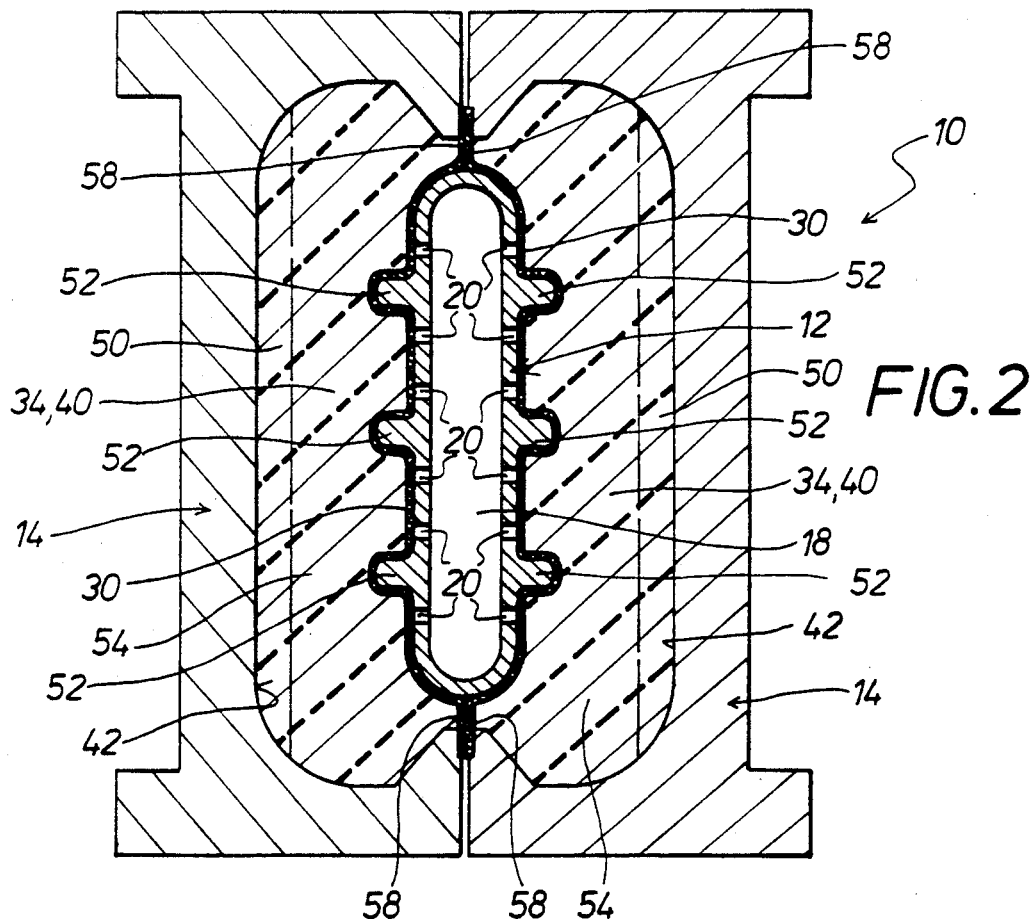
FIG.2
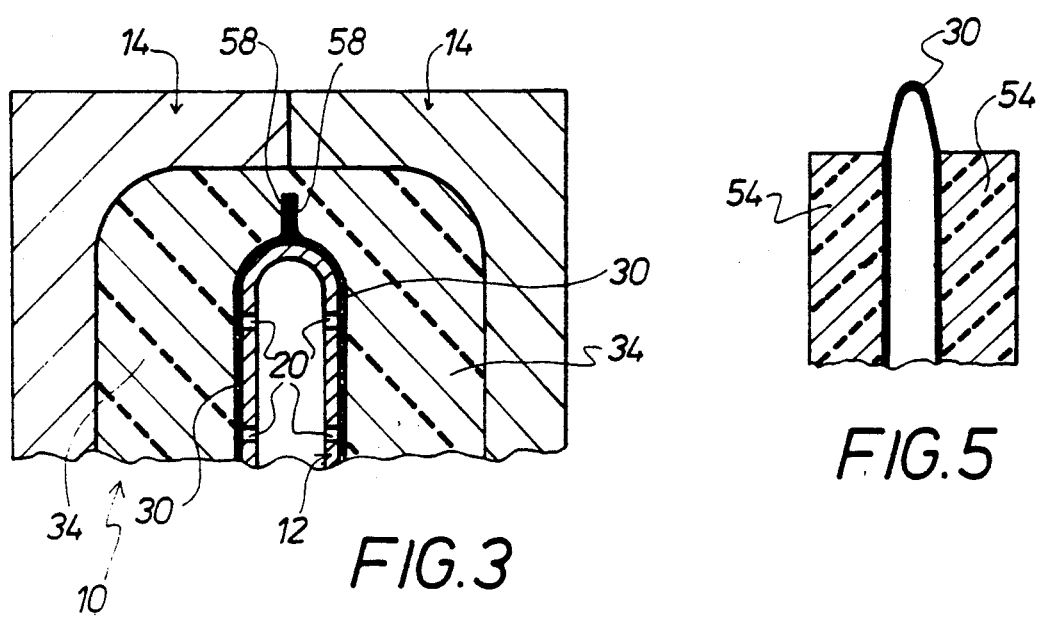
FIG.3
FIG.5

PROCESS FOR THE PRODUCTION OF A FOAM-BACKED CUSHION PORTION

BACKGROUND OF THE INVENTION

There are a number of processes for producing foam-backed upholstery or cushion portions comprising a cover with a core of a foam material on the inside thereof. DE 36 27 221 A1 discloses such a process for producing a foam-backed upholstery or cushion portion wherein the cover of the cushion portion is clamped between two parts of a clamping frame, defining a hollow space or cavity therein, whereupon the clamping frame is positioned between two parts or halves of a mold. A reaction mixture is then introduced into the cavity formed within the cover, and the reaction mixture, on foaming up, urges the cover into contact against the inside surfaces of the two mold portions. A reduced pressure can be applied to the mold portions in known manner to ensure that the cover bears in a snug and wrinkle-free manner against the inside surfaces of the mold portions. It will be seen therefore that that process requires the reaction mixture to be introduced between the edges of the cover and thus between the two components making up the clamping frame which holds the cover in position. In terms of apparatus structure, that requires a not inconsiderable level of expenditure, while in addition the operation of introducing the reaction mixture into the cavity defined by the cover also involves a not inconsiderable amount of time.

SUMMARY OF THE INVENTION

An object of the present invention is to provide a process for the production of a foam-backed cushion portion, with which it is comparatively easily possible to produce foam-backed cushion portions with an all-embracing cover thereon.

Another object of the invention is to provide a process for the production of a foam-backed cushion portion which affords an improved product while involving relatively simple operating procedures.

Still another object of the present invention is to provide apparatus for the production of a foam-backed cushion portion which involves a simple sequence of straightforward operating steps, thus providing a reduced cycle time for the process.

In accordance with the principles of the present invention these and other objects are attained by a process for the production of a foam-backed upholstery or cushion portion comprising a cover and having a front side and a rear side. A cover portion for providing said cover, of a generally sock-like configuration having a first open end and a closed oppositely disposed second end is arranged over a generally tongue-shaped mold portion, with the surface of the cover portion which in the cushion portion produced forms the outside surface of the cover, turned over inwardly, so that said surface of the cover portion is towards the mold portion. A foam backing is then applied to the cover portion on a first side of the mold portion with the cover portion thereon, thereby to provide a first side of the cushion portion, for example the front side, and a foam backing is applied to the cover portion on a second side of the mold portion in opposite relationship to the first side thereof, to provide a second side of the cushion portion, for example the rear side. Thereupon the cover portion with its foam backings thereon is removed from the mold portion and turned back outside in again so that the foam backings on the cover portion provide a foam core in the interior of the cover portion, constituting a foam-backed cushion portion.

In a particular form of that procedure, the cover portion is applied with its surface which in the cushion portion forms the outside surface of the cover against a first mold portion, two second mold portions are then arranged beside the first mold portion and at a spacing therefrom so as to form at least one mold cavity which is open at one end between the first mold portion and the two second mold portions, with a cover disposed on the open end of the second mold portions to close the mold cavity. A reaction mixture is then introduced into the mold cavity and foams up therein to fill the mold cavity. After the reaction of the reaction mixture has occurred, the cover on the mold and the two second mold portions are removed, whereupon the preform produced in that way for the foam-backed cushion portion, which with its cover forms a central cavity open at one end thereof, is removed from the first mold portion. The above-defined preform is then manipulated in such a way that the cover is on the outside and the foam backing portions produced from the reaction mixture in the mold are disposed in the interior thereof. Accordingly, in a first working step in the procedure of the invention, a foam-backed preform for the cushion portion is produced in the mold comprising the first mold portion, the two second mold portions and the cover, and then, after the mold has been opened and the preform removed therefrom, the preform is turned inside out to provide the foam-backed cushion portion.

In a preferred feature of that process, it is possible for the first mold portion ot be provided with ribs and/or depressions which form corresponding depressions and/or ribs respectively in the cover on the finished foam-backed cushion portion. In addition, so that the cover can be caused to bear with its outward surface against the first mold portion in a snug and wrinkle-free condition, the first mold portion may be designed to apply a vacuum thereto, by way of passages in the first mold portion.

In a preferred feature, the cover can be sucked with the outward surface thereof into snug contact with the first mold portion before the two second side mold portions are arranged at respective sides of the first mold portion at a spacing therefrom, thereby to form at least one mold cavity for producing the foam backing portions on the cover.

In a preferred feature, the cover portion can be fixed to a base element from which the first mold portion projects. The cover can be fixed to the base element in that way by means of a suitable clamping configuration such as a clamping frame.

The reaction mixture is preferably introduced into the mold cavity in the mold through at least one feed channel in the mold cover. That permits the mold to be filled with the reaction mixture in a simple manner without major difficulty so that the foam-backed cover to provide the cushion portion can be produced in a comparatively short cycle time, whereupon the foam-backed cover portion can be turned outside in to provide the cushion portion itself. The operation of turning the foam-backed cover portion outside in can be effected manually or by means of suitable equipment in an automatic procedure.

In order to provide a foam-backed cushion portion of stable configuration after the foam-backed preform or cover portion has been turned outside in, it is preferable for the mold to comprise the two second mold portions of such a nature that they are provided with raised portions and/or depression portions at their faces which are towards the first mold portion. The raised portions and/or depression portions on the two second mold portions form connecting portions at the associated outside surfaces of the preform constituted by the foam backing portions on the cover portion. After that preform has been turned outside in, the raised portions in one backing portion thereon come to lie in corresponding depression portions in the other foam backing portion, thereby providing that the outside surfaces of the preform, as considered when in the mold cavity and which now bear against each other in the interior of the cushion portion produced therefrom, are in interlocking relationship with each other.

However the outside surfaces of the foam backing portions produced on the cover portion in the mold in accordance with the above-discussed procedure do not necessarily have to lie directly against each other and be engaged with each other, for it is also possible to introduce an insert portion into the preform when it is being turned inside out, so that the insert portion lies between the two surfaces of the foam backing portions which face outwardly and away from each other in the position they adopt in the mold cavity and which thus face towards each other at the middle of the foam-backed cushion portion. The insert portion makes it possible to provide for enhanced stability in respect of shape of the foam-backed cushion portion.

Further objects, features and advantages of the present invention will be apparent from the following description of the process and apparatus in accordance with the invention.

BRIEF DESCRIPTION OF THE DRAWINGS

FIG. 2 is a view in section taken along line II—II in FIG. 1, FIG. 3 is a view in section corresponding to that shown in FIG. 2 through part of another configuration of the mold, FIG. 5 is a diagrammatic view, partly in section, of a second embodiment of the preform prior to the operation of turning it inside out to produce a foam-backed cushion portion which is covered on all sides by a cover.

DESCRIPTION OF PREFERRED EMBODIMENTS

Figure 1:
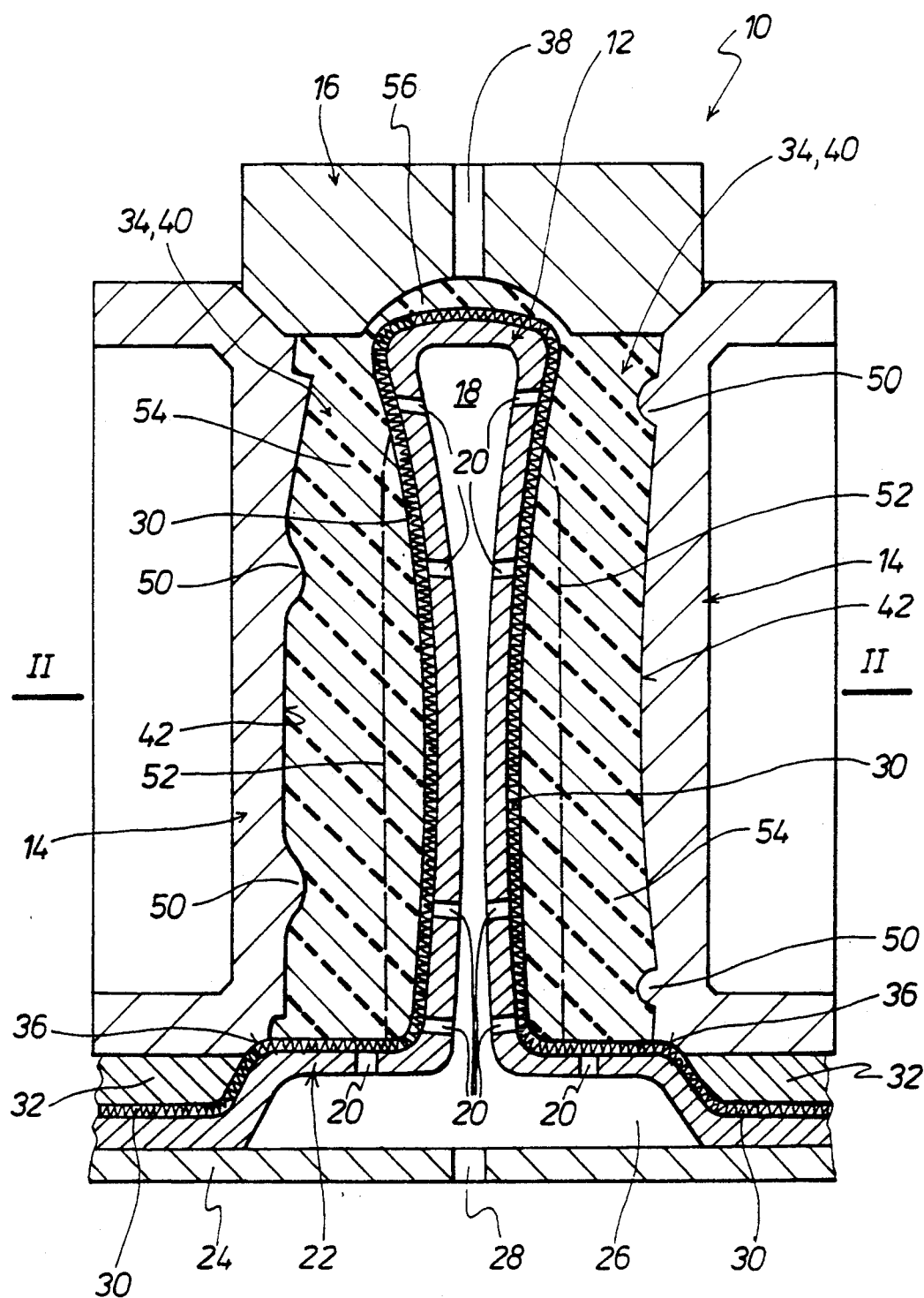
FIG. 1 is a view in longitudinal section through a mold for the production of a preform article for providing a foam-backed cushion portion.

Referring firstly to FIG. 1, shown therein at reference numeral 10 is a mold for use in the process according to the invention for the production of a foam-backed cushion portion. More specifically, the mold 10 is used to produce an article which is referred to herein as a preform for the foam-backed cushion portion, the details of which preform will become more clearly apparent in the course of the description hereinafter.

Looking at FIG. 1, the mold 10 comprises a first mold portion 12 of a generally tongue-shaped configuration, two second mold portions 14 which are arranged on respective sides of the first mold portion 12, and a cover 16 which sits atop the two second mold portions 14 and extends over the first mold portion 12. The first mold portion 12, which can be seen to be of a generally blade-like configuration in an upstanding position in the configuration shown in FIG. 1, has a central cavity 18 therein and is provided with passages or ducts 20 which communicate with the central cavity 18. The first mold portion 12 stands upwardly away from a base portion indicated at 22, which co-operates with a bottom portion 24 to define a cavity 26. The cavity 26 is in suitable fluid communication with the central cavity 18 in the first mold portion 12. The bottom portion 24 is provided with at least one outlet opening 28 which can be brought into fluid communication with a vacuum source (not shown). Like the first mold portion 12, the base portion 22 has passages or ducts 20 therein, so that it is possible to apply a vacuum to the cavities 26 and 18 and that vacuum will thus be applied to a cover portion 30 which consists of one or more pieces of suitable material, disposed on the first mold portion 12, thereby to cause the cover portion 30 to be sucked against the first mold portion 12 and the base portion 22 in a fold-free and snug fashion. The cover portion 30 is fixed to the first mold portion 12 and to the base portion 22 operatively associated therewith by means of a clamping frame as indicated at 32. After the fixing operation and after the cover portion 30 has thus been applied to the first mold portion 12 in a snug, wrinkle-free condition, the two second mold portions 14 are brought into position at respective sides of the first mold portion 12 at spacings therefrom, so that at least one mold cavity 34 which is open upwardly is provided between the first mold portion 12 and the two second mold portions 14. The two second mold portions 14 bear sealingly against the cover portion 30 along a circumferentially extending portion indicated at 36 at respective sides of the first mold portion 12 in FIG. 1. After the second mold portions 14 have been moved into the illustrated position, the mold cavity 34 is closed by means of the cover 16 of the mold 10.

The cover 16 has at least one feed channel or runner 38 through which a reaction mixture as diagrammatically indicated at 40 in FIG. 1 can be introduced into the mold cavity 34. During reaction of the reaction mixture 40, the latter foams up and at least substantially completely fills the entire mold cavity 34. After the reaction has occurred, the cover 16 and the two second mold portions 14 are removed, whereupon the resulting preform is removed from the first mold portion 12.

It will be noted here that the above-mentioned preform comprises the cover portion 30 and foam-backing portions which are applied to respective sides thereof by virtue of the foaming of the reaction mixture 40 in the mold cavity 34. It will also be noted that the cover portion 30 is applied to the first mold portion 12 in such a way that the surface of the cover portion which in the finished cushion portion produced therefrom constitutes the outside surface of the cover is applied to the surface of the first mold portion 12, by virtue of the cover portion which is of a generally sock-like configuration having a first end which is closed and a second end which is open being turned inside out over the first mold portion 12.

Figure 4:
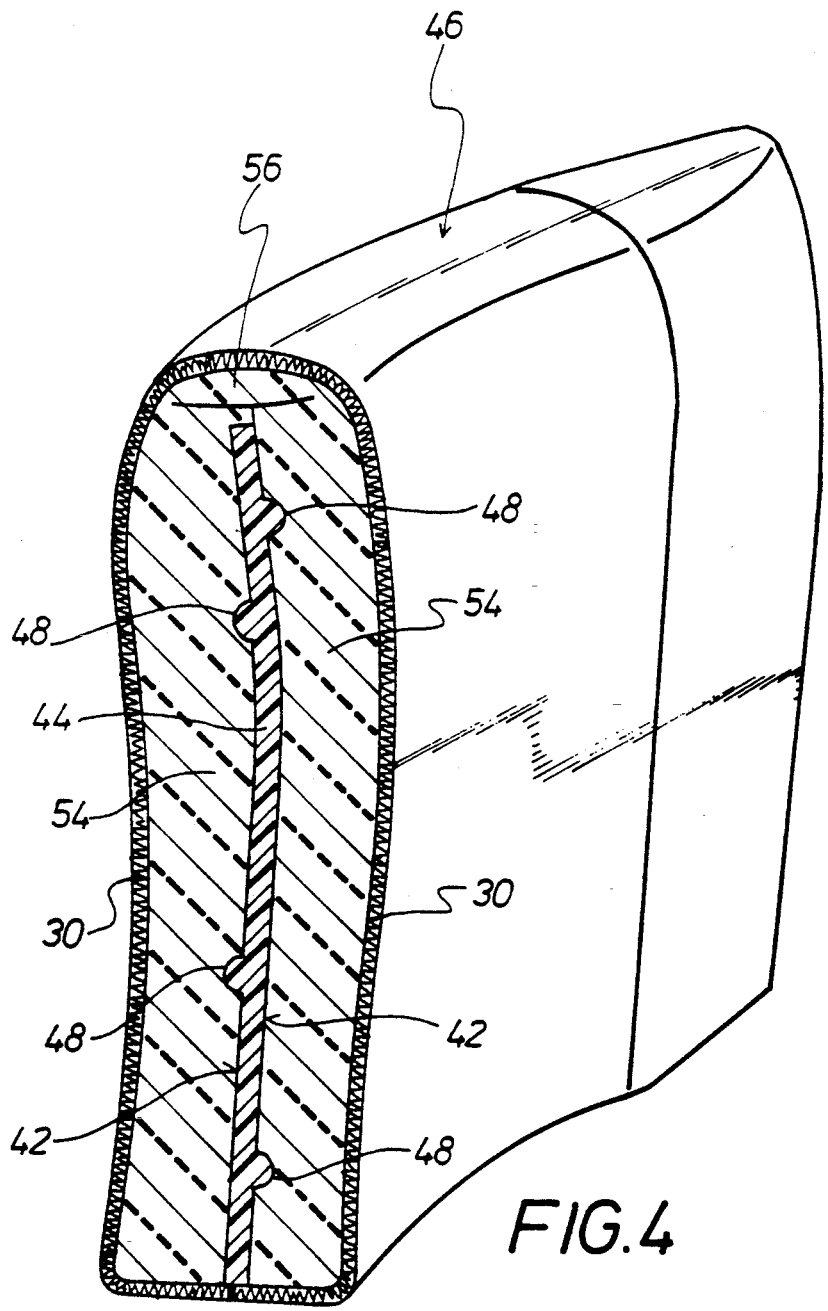
FIG. 4 is a perspective view partly in section of a foam-backed cushion or upholstery portion produced in the apparatus shown in FIG. 1.

When the preform produced in that way has been removed from the first mold portion 12, it is turned inside out so that the two outside surfaces 42 of the preform, which are provided by the surfaces of the foam backing portions produced on respective sides of the first mold portion 12, in contact with the mutually facing inside surfaces of the two second mold portions 14, which surfaces of the foam backing portions therefore do not have any cover material thereon, come to bear against each other at least in closely adjacent relationship, as can be seen from FIG. 4 with the cushion portion in its finished configuration.

It will be appreciated that, in the cushion portion shown in FIG. 4, an insert portion as indicated at 44 is disposed between the two surfaces 42 of the foam backing portions of the preform produced in the mold shown in FIG. 1, the insert portion 44 serving to enhance the stability in respect of shape of the cushion portion. It will also be seen from FIG. 4 that the cushion portion as generally indicated at 46 is embraced by the cover 30 on all sides thereof, thus constituting a closed unit.

Still looking at FIG. 4, in order to provide a mechanically strong connection between the surfaces 42 of the foam backing portions of the preform produced in the FIG. 1 mold, where those surfaces lie directly against each other, or in order to provide such a connection between the surfaces 42 and the insert portion 44 where the latter is provided as in the cushion portion shown at 46 in FIG. 4, the two outward surfaces 42 of the preform, as shown in FIG. 1, may be provided with depression portions as indicated at 48 in FIG. 4, and/or with raised portions. For that purpose, as shown in FIG. 1, the two second mold portions 14 have corresponding raised portions as indicated at 50, and/or depression portions.

Referring still to FIGS. 1 and 4, shown therein are respectively a preform and a cushion portion 46, wherein the preform has first and second foam core portions 54 constituting the foam backing portions, which are connected together by means of a foam core bridge portion 56 extending over the upward end of the first mold portion 12, with the cover portion 30 thereon, between the cover portion 30 and the adjoining inwardly facing surface of the cover 16 of the mold. The foam core bridge portion 56 is produced by the cover 16 of the mold 10 being of a suitable configuration at that location. The connection between the two foam core portions 54 by means of the foam core bridge portion 56 can also be clearly seen from FIG. 4 which also clearly shows the way in which the cover portion 30 embraces the cushion portion 46 on all sides thereof.

As an alternative to the configuration with the foam core bridge portion, reference is made at this point to FIG. 5 which is a diagrammatic view on two foam core portions 54 which are not connected together by means of a foam core bridge portion as indicated at 56 in FIG. 4, but only by means of a part of the cover 30. In other respects production of the cushion portion illustrated in FIG. 5 corresponds to the mode of production described hereinbefore with reference to FIGS. 1 and 4, that is to say, after production of the preform diagrammatically shown in FIG. 5, the preform is turned outside in so that the cover portion 30 which in the course of the molding operation lay against the surface of the first mold portion 12 comes to lie on the outside in the foam-backed finished cushion portion and the cushion portion is thus completely enclosed thereby.

Reference will now be made to FIG. 2 which shows that the two second mold portions 14 and the first mold portion 12 can be of such a configuration as to define first and second mold cavities 34 which are at least substantially spatially separated from each other by edge portions 58 of the cover portion 30. The two second mold portions 14 bear sealingly against the edge portions 58 of the cover 30, for that purpose.

It will also be seen from FIG. 2 that the first mold portion may also readily be provided with surface structuring as indicated at 52, for example in the form of ribs or the like. Such a mold 10 makes it readily possible to provide a preform for a foam-backed cushion portion, which bears suitable surface structuring, with the cushion portion 46 then being produced therefrom by turning the foam-backed preform inside out, in the above-described manner.

Reference will now be made to FIG. 3 showing a view in cross-section through a part of a modified form of the mold 10 which differs from the mold 10 shown in FIG. 2 insofar as the two second mold portions 14 do not bear sealingly against the edge portions 58 of the cover 30 but are spaced therefrom, so that the mold defines a single mold cavity 34 between the second mold portions 14 and the first mold portion 12 disposed therein. The preform produced in that mold can be turned outside in in precisely the same way as a preform produced in a mold 10 as shown in FIGS. 1 and 2, thereby to produce the foam-backed cushion portion of the invention.

In another form of the procedure, a foam backing portion is applied to the cover portion on the first mold portion 12 on the first and second sides thereof and at the same time on two lateral connecting portions, which face away from each other, between the first and second sides of the first mold portion 12, so that the foam core portion associated with said first side and the foam core portion associated with said second side are suitably connected by lateral connecting foam core portions. The foam backing applied to the cover portion at the closed end thereof, being the upward end on the first mold portion 12 for example in FIG. 1, is so applied as to interconnect the foam core portions associated with the respective sides thereof, and also the connecting foam core portions.

It will further be appreciated that the second mold portions may be provided by a sleeve-like mold portion of an integral or one-piece configuration.

It will be appreciated that the foregoing procedures and apparatuses have been set forth solely by way of example and illustration of the principles of the present invention and that various modifications and alterations may be made therein without thereby departing from the spirit and scope of the invention.

What is claimed is:

1. A process for the production of a foam-backed cushion portion comprising a cover enclosing the cushion portion all around, the cushion portion having a front side and a rear side, wherein a cover portion for providing said cover of a generally sock-like configuration having a first open end and a closed oppositely disposed second end is arranged over a generally blade-like mold portion such that a cover portion surface, which forms an outside surface of the cover, is turned over inwardly so that said surface of the cover portion is toward the mold portion, wherein a foam backing is then applied to the cover portion by foaming on a first side of the mold portion to provide a first side of the cushion portion, and a foam backing is applied to the cover portion by foaming on a second side of the mold portion which is in an opposite relationship to said first side thereof to provide a second side of the cushion portion, and wherein thereupon the cover portion with its foam backings is removed from the mold portion and turned inside out such that the foam backings provide a foam core in the interior of the cover portion.

2. A process as set forth in claim 1 wherein said foam backings are applied to the cover portion on the first and second sides of said mold portion separately from each other whereby the foam backing at the first side of the mold portion is separated from the foam backing at the second side of the mold portion.

3. A process as set forth in claim 2 wherein said foam backings applied to the cover portion on the first and second sides of the mold portion are spatially separated from each other by the cover portion on the mold portion.

4. A process as set forth in claim 1 wherein foam backings are applied to the cover portion on the first and second sides of the mold portion and at the same time on two lateral cover connecting portions which face away from each other between the first and second sides of the mold portion so that the foam backing at the first side of the mold portion and the foam backing at the second side of the mold portion are connected by lateral connecting foam core portions.

5. A process as set forth in claim 1 wherein a foam backing is applied to the cover portion at the closed end in such a way as to interconnect at least the foam backing at the first side of the mold portion and the foam backing at the second side of the mold portion.

6. The process of claim 5 wherein said foam backing applied to the cover portion at the closed end thereof includes a first foam core portion and a second foam core portion, and a foam core bridge portion connecting said first and second foam core portions, said foam core bridge portion extending over an upward end of the first mold portion and an upward end of said cover portion.

7. A process as set forth in claim 1 wherein the foam backings at the first and second sides of the mold portion are respectively provided with engagement means.

8. A process as set forth in claim 7 wherein said foam backings are connected by means of said engagement means cooperating with each other after the cover portion has been turned inside out such that the foam backings provide a foam core in the interior of the cover portion.

9. A process as set forth in claim 7 wherein an insert portion is interposed between said foam backings and wherein said foam backings are secured together by said engagement means co-operating with said insert portion.

* * * * *